(12) United States Patent
Wu et al.

(10) Patent No.: US 8,423,343 B2
(45) Date of Patent: Apr. 16, 2013

(54) HIGH-PARALLELISM SYNCHRONIZATION APPROACH FOR MULTI-CORE INSTRUCTION-SET SIMULATION

(75) Inventors: Meng-Huan Wu, Hsinchu (TW); Ren-Song Tsay, Jhubei (TW)

(73) Assignee: National Tsing Hua University, Hsin Chu (TW)

( * ) Notice: Subject to any disclaimer, the term of this patent is extended or adjusted under 35 U.S.C. 154(b) by 191 days.

(21) Appl. No.: 13/011,942

(22) Filed: Jan. 24, 2011

(65) Prior Publication Data

US 2012/0191441 A1 Jul. 26, 2012

(51) Int. Cl.
G06F 17/50 (2006.01)
G06F 9/44 (2006.01)
G06F 13/10 (2006.01)
G06F 13/12 (2006.01)

(52) U.S. Cl.
USPC ......... 703/20; 703/2; 703/19; 703/21; 703/22

(58) Field of Classification Search ...................... 703/20
See application file for complete search history.

(56) References Cited

U.S. PATENT DOCUMENTS

| | | | |
|---|---|---|---|
| 5,615,357 A * | 3/1997 | Ball ............................... | 703/21 |
| 5,978,838 A * | 11/1999 | Mohamed et al. ............ | 709/208 |
| 6,230,114 B1 * | 5/2001 | Hellestrand et al. .......... | 703/13 |
| 6,584,436 B2 * | 6/2003 | Hellestrand et al. .......... | 703/13 |
| 6,892,286 B2 * | 5/2005 | Hangal et al. ................. | 711/154 |
| 7,133,820 B2 * | 11/2006 | Pennello et al. .............. | 703/22 |
| 7,331,040 B2 * | 2/2008 | Sandham et al. ............. | 717/136 |
| 7,493,606 B2 * | 2/2009 | Morin ........................... | 717/149 |
| 7,770,050 B2 * | 8/2010 | Sargaison et al. ............ | 713/600 |
| 7,779,393 B1 * | 8/2010 | Manovit et al. ............... | 717/132 |
| 7,873,506 B2 * | 1/2011 | Hintikka et al. ............... | 703/19 |
| 7,873,507 B2 * | 1/2011 | Tatsuoka et al. ............. | 703/21 |
| 8,006,204 B2 * | 8/2011 | Killian et al. ................. | 716/100 |
| 2002/0032559 A1 * | 3/2002 | Hellestrand et al. .......... | 703/22 |
| 2002/0152061 A1 * | 10/2002 | Shimogori et al. ............ | 703/21 |
| 2003/0074177 A1 * | 4/2003 | Bowen ........................... | 703/22 |
| 2003/0105620 A1 * | 6/2003 | Bowen ........................... | 703/22 |
| 2005/0204316 A1 * | 9/2005 | Nebel et al. .................... | 716/2 |
| 2007/0294074 A1 * | 12/2007 | Ciolfi ............................ | 703/21 |
| 2008/0189528 A1 * | 8/2008 | Robinson ....................... | 712/226 |
| 2009/0172630 A1 * | 7/2009 | Wang et al. ................... | 716/18 |
| 2010/0229036 A1 * | 9/2010 | Goyal et al. ................... | 714/25 |
| 2010/0269103 A1 * | 10/2010 | Wu et al. ...................... | 717/146 |
| 2011/0295587 A1 * | 12/2011 | Eeckhout et al. ............. | 703/21 |

OTHER PUBLICATIONS

Wu et al. "An Effective Synchronization Approach for Fast and Accurate Multi-core Instruction-set Simulation", Oct. 2009.*
Agarwal et al. "Scalable Graph Exploration on Multicore Processors", IEEE 2010.*
Ryoo et al. "Optimization Principles and Application Performance Evaluation of a Multithreaded GPU Using CUDA", ACM 2008.*
Hao, Lee, "ARM Instruction Set Simulation on Multi-Core x86 Hardware", 2009.*
Raghav et al. "Scalable Instruction Set Simulator for Thousand-core Architectures Running on GPGPUs", 2010.*
Basic Blocks—GNU Compiler Collection (GCC) Internals.*

* cited by examiner

*Primary Examiner* — Shambhavi Patel
(74) *Attorney, Agent, or Firm* — Chih Feng Yeh; Huntington IP Consulting Co., Ltd.

(57) ABSTRACT

The present invention discloses a high-parallelism synchronization method for multi-core instruction-set simulation. The proposed method utilizes a new distributed scheduling mechanism for a parallel compiled MCISS. The proposed method can enhance the parallelism of the MCISS so that the computing power of a multi-core host machine can be effectively utilized. The distributed scheduling with the present invention's prediction method significantly shortens the waiting time which an ISS spends on synchronization.

10 Claims, 8 Drawing Sheets

HIGH-PARALLELISM SYNCHRONIZATION APPROACH FOR MULTI-CORE INSTRUCTION-SET SIMULATION

TECHNICAL FIELD

The present invention is generally related to a method for instruction-set simulation. More particularly, the present invention is directed to a high-parallelism synchronization approach for multi-core instruction-set simulation.

BACKGROUND OF THE RELATED ART

With the development of technology, instruction-set simulator (ISS) is an indispensable tool for system level design. A hardware designer is able to perform the exploration and/or verification by an instruction-set simulator before the realization of the design. As a result, it is able to decrease the non-recurring engineering cost (NRE cost) in product development. A software designer can test a program on an instruction-set simulator instead of running it on real target machines, and hence the turnaround time can be reduced.

After several years of development, the performance of the traditional instruction-set simulator integrated into a single core machine is nearly optimum (fast and accurate). However, as the evolution of semiconductor manufacturing processes, two or more processors can be encapsulated in a single chip. Traditional single-core systems have been gradually substituted by multi-core systems. In order to maximize multi-core efficiency, more and more applications or programs are developed by using parallel programming model; however, the instruction-set simulator of a traditional single core system cannot manage the different cores synchronously so that simulations by different cores are not executed efficiently.

In a multi-core system, a plurality of programs is simultaneously and synchronously performed. So far, multi-core instruction-set simulation (MCISS) is designed for the programs on multi-core systems. Generally, multi-core instruction-set simulation can be established by a plurality of instruction-set simulators; however, it might result in that the instruction-set simulators randomly being arranged to the idle host core.

Simulation time means that the time for performing the instruction-set simulators by a host core, and target time means that the actual time for the simulated programs performed in the target. The time points needing to be synchronized are named "sync point", and each clock tick starts is a sync point. The instruction-set simulators need to stop at each sync point for the purpose of performing synchronization. Therefore, lock-step approach incurs overhead in synchronization.

As multi-core systems are gradually replacing single-core systems, the corresponding Multi-Core Instruction-Set Simulator (MCISS) is also becoming more crucial. Intuitively, to attain a MCISS, a single-core ISS can be used to simulate each target core and perform the co-simulation that runs all the ISSs in parallel to gain simulation performance.

Timing synchronization is used to keep timing consistency for ensuring accurate concurrent behaviors of multiple simulated components. An intuitive approach is to synchronize all components at every cycle. This approach is usually named the cyclebased or lock-step approach. Though it offers accurate simulation, however, the heavy synchronization overheads would significantly slow down the simulation. Enlarging synchronization intervals could certainly improve performance, but it would also result in inaccurate simulation.

In order to attain a fast and accurate co-simulation, partial order synchronization approaches are proposed. The idea is to maintain correct data flow, i.e., data dependency. In reality, programs can only influence each other via their shared memory accesses. As long as the temporal order of all the shared memory accesses is maintained, consistent data dependencies between programs will be obtained. To do so, timing synchronization is only required to perform at each shared memory access. Since the number of shared memory accesses is considerably smaller than the number of total execution cycles, light-weight synchronization efforts allow this shared memory based approach to be more efficient than the lock-step approach. Meanwhile, this approach can guarantee accurate MCISS simulation results.

Nevertheless, conventional co-simulation approaches such as SystemC usually adopts a centralized scheduler 100 to handle timing synchronization between each ISS, as illustrated in FIG. 1. In order to maintain timing consistency, centralized scheduling always selects the slowest ISS for execution. Even if it allows parallel simulation, only one ISS can actually be executed for most of the time. Therefore, this approach highly limits the degree of parallelism of a MCISS. Considering the fact that the number of cores to simulate continues to increase, it is necessary to leverage parallelism to gain better simulation performance from the computing power of a host multi-core machine.

The centralized scheduling mechanism can be either sequential or parallel. The difference is that the sequential version cooperatively executes the tasks, so only one task is executed at one time. On the contrary, in the parallel version, more than one task can execute in parallel.

Generally, multi-core instruction-set simulation (MCISS) should run in parallel to improve simulation performance. However, the conventional low-parallelism centralized scheduler greatly constrains simulation performance. To resolve this issue, a high-parallelism distributed scheduling mechanism for MCISS is proposed.

SUMMARY

In these regards, the present invention is directed to a high-parallelism synchronization approach for multi-core instruction-set simulation.

To resolve above-mentioned issue, the present invention is directed to a high-parallelism distributed scheduling mechanism for MCISS, and it enables to perform an instruction-set simulation more rapidly.

One advantage of the present invention allows that the multi-core instruction-set simulation provides the function of synchronization and maintains the accuracy.

The other advantage of the present invention is keeping the speed in a good level and efficiently decreasing the synchronization overhead.

The high-parallelism synchronization method for multi-core instruction-set simulation disclosed by the present invention comprises performing the best-case prediction of future sync points for each ISS of multi-core instruction-set simulation by analyzing control flow graphs of a simulated program by a static module. Then, it is performing to estimate the best-case execution time of each basic block and/or path for the each ISS of the multi-core instruction-set simulation in the control flow graphs by the static module. Subsequently, it is utilizing distributed scheduling the each ISS of the multi-core instruction-set simulation based-on the best-case prediction of the future sync points and the best-case execution time for significantly shortening the waiting time of the each ISS spent on synchronization.

The method further comprises checking whether next sync point for the each ISS belongs to the same block; if it does, the relative execution time to the next sync point can be calculated; otherwise, traverse its succeeding blocks to make a best-case prediction of the next sync point based-on the shortest path.

The best-case prediction of the next sync point for each ISS is performed by recursively checking its succeeding blocks until reaching a sync point. The best-case prediction of the next sync point for each ISS comprises a step of pre-calculating the best-case delay to the next sync point of each ISS, wherein pre-calculating the best-case delay comprises two types of points which one is a tail of the next sync point and another is a head of each basic block. The predicted execution timing of the next sync point for each ISS can be determined by summing up its current local time and best-case prediction time.

The method further comprises updating the information about predicted next sync point, and deciding whether to wait or continue executing when encountering the next sync point based on the information.

The above distributed scheduling is allowing each ISS to schedule with others autonomously to run at the same time. Wherein as first ISS of the multi-core instruction-set simulation is encountering next sync point, no waiting for second ISS of the multi-core instruction-set simulation is required if predicted next sync point of the first ISS is to occur in future time. In another example, wherein as first ISS's predicted next sync point of the multi-core instruction-set simulation is earlier than the actual next sync point, and second ISS of the multi-core instruction-set simulation has to wait because of the false-predicted temporal relationship. As the first ISS keeps progressing, the best-case prediction will be updated to approach the actual next sync point. As long as the first $ISS_1$'s predicted next sync point becomes later than the current sync point of the first ISS, the second ISS can resume its execution synchronously.

To further understand technical contents, methods and efficacy of the present invention, please refer to the following detailed description and drawings related the present invention.

BRIEF DESCRIPTION OF THE DRAWINGS

The invention is more fully appreciated in connection with the following detailed description taken in conjunction with the accompanying drawings; however, those skilled in the art will appreciate that these examples are not intended to limit the scope of the present invention, and various changes and modifications are possible within the sprit and scope of the present invention.

DESCRIPTION OF THE PREFERRED EMBODIMENT

In the description below, for the purposes of explanation, numerous specific details are set forth in order to provide a thorough understanding of the present invention. It will be apparent, however, to one skilled in the art that the present invention may be practiced without some of these specific details. Furthermore, the terms described in the preferred embodiment of the present invention shall be interpreted in most extensive and reasonable way.

Furthermore, in order to overcome said drawbacks of prior arts about the synchronization of multi-core instruction-set simulation, the present invention is able to identify the correlation among different processors and synchronize the instruction-set simulator of each core by means of the correlation among different cores for the purpose of achieving a correct simulation result.

In a shared memory model, executive programs for different cores indirectly interact with each other by means of reading/writing accesses of the memories. Hence, in order to ensure a correct simulation result, the accesses of memories shall be performed in order if any two of memory accesses to the same data address are provided with any one of the dependency relationships as follow: (1) write after write (WAW), (2) write after read (WAR), and (3) read after write (RAW). The term "synchronization" described in the specification means the process for checking or maintaining the above dependency relationship. The corresponding memory access points are named "sync points".

Because the instruction-set simulator executes the programs in sequence, the memory accesses in one program will always be executed in order. Consequently, in the method for synchronization of the present invention, it only needs to identify and maintain the memory accesses among the different programs and execute them in the right order. Theoretically, it only needs to identify whether the memory accesses to the same address are provided with any one of the above dependency relationship; however, in real practice, the memory space is too large to track different addresses. Besides, the indirect addressing mode which is common to use is unable to statically predict the correct access address. If regard each access of the memories as a sync point, a large number of memory accesses result in simulation speed becoming very slow.

In respect of software, only few shared variables are provided with data dependency relationship of memory access. As a result, if the shared variables are the only factors for consideration, it is able to significantly reduce the numbers of sync points.

Figure 1:
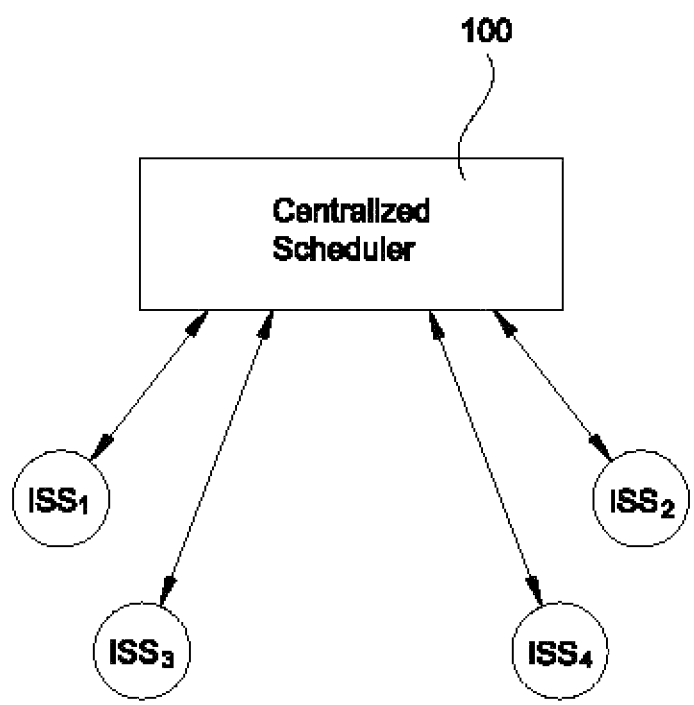
FIG. 1 illustrates a centralized scheduling mechanism.
Figure 2A:
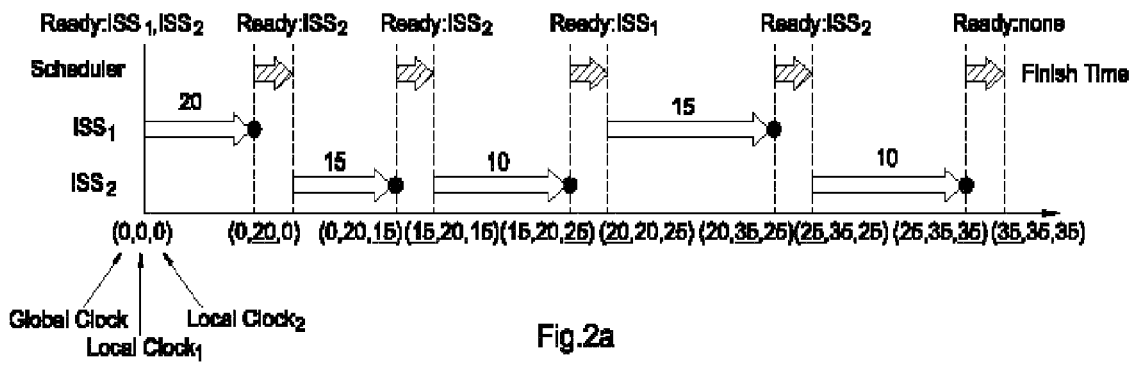
FIG. 2a illustrates the simulation timing diagram of a sequential MCISS example with centralized scheduling.

FIG. 2a shows the simulation timing diagram of a sequential MCISS example with centralized scheduling. When an ISS encounters a sync point, a centralized scheduler 100 will be invoked to determine the next active ISS. Here, a sync point is annotated in front of each shared memory access, as mentioned previously. To ensure the temporal order of sync points, it always selects the slowest ISS to run. In such example, two ISSs ($ISS_1$ and $ISS_2$) are involved. The scheduler 100 keeps a global time using a global clock while each ISS has a local clock to record its own local time. For example, the global time and the clock time represent by (global clock, local clock$_1$, local clock$_2$). At the beginning, both the local clock and the global clock are initialized to zero which indicates as (0, 0, 0). An ISS is ready only if its local time is of the same value as the global time. For sequential simulation, the scheduler 100 cooperatively selects one of the ready ISSs for execution at a time. For the selected ISS, the corresponding local time advances along with the progress of execution. Then, at the next sync point, the executed ISS is pushed back to a waiting queue and the scheduler 100 selects the next ready ISS to execute. Once there are no more ready ISSs, the scheduler 100 will advance the global clock until an ISS becomes ready. It is noted that both the local clock and the global clock represent the simulated time from the perspective of the target. In contrast, the simulation time is the time for the simulation to run on the host. Ideally, it can shorten the whole simulation time by running the ISSs in parallel.

Figure 2B:
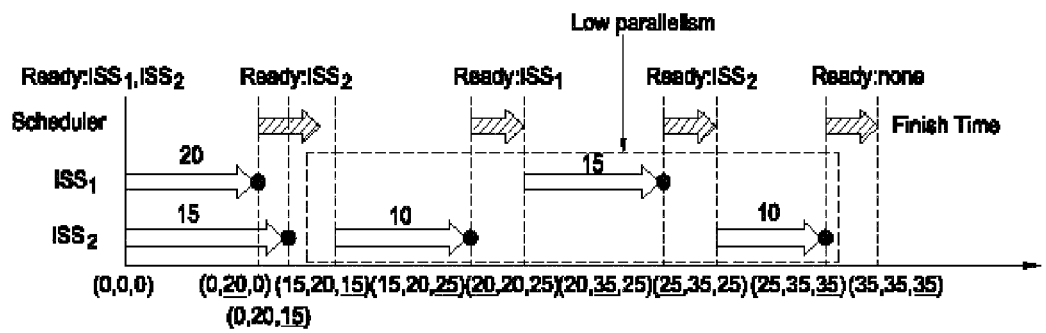
FIG. 2b illustrates the simulation timing diagram of a parallel MCISS example with centralized scheduling.

In another example, as illustrated in FIG. 2b, it shows the simulation timing diagram of a parallel MCISS example with centralized scheduling. In such centralized scheduling mechanism, only the ready ISSs can be actually executed at the same time. This implies that ISSs must have the same local clock time at a sync point, or they cannot be executed simultaneously. Unfortunately, this case rarely occurs in a MCISS with shared memory based synchronization, since programs seldom access shared memory at exactly the same time. In other words, when the scheduler 100 is invoked, typically only one ISS is ready. For example, in FIG. 2b, both ISS$_1$ and ISS$_2$ are ready at the very beginning (start at the same time). Other than that, only one of them is ready at other synchronization points, thereby leading to low parallelism. As a result, the parallel simulation of a MCISS with centralized scheduling barely improves simulation performance in practice.

Figure 3:
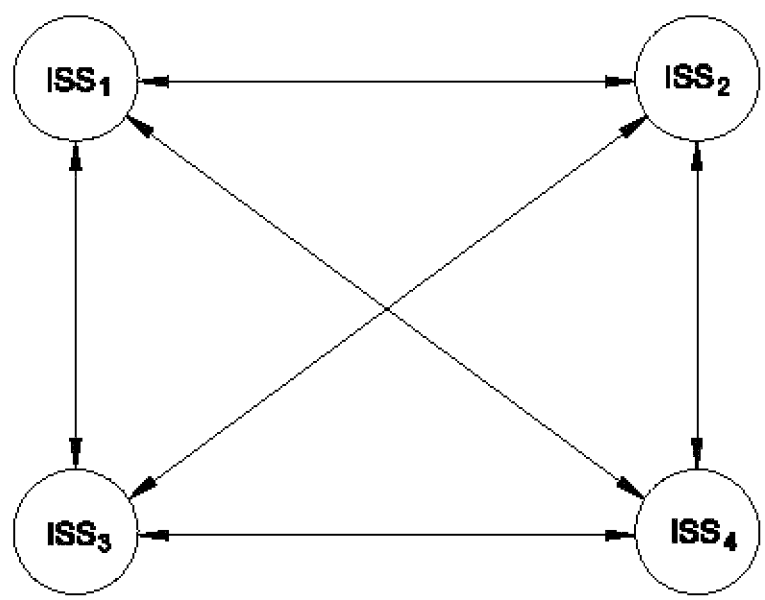
FIG. 3 illustrates a distributed scheduling mechanism according to the present invention.

To further improve simulation performance of the centralized scheduling approach, a high-parallelism distributed scheduling mechanism for better MCISS parallelization is proposed. As illustrated in FIG. 3, it shows distributed scheduling mechanism, by allowing each ISS to schedule with others ISSs autonomously, more ISSs, for example four ISSs (ISS$_1$, ISS$_2$, ISS$_3$ and ISS$_4$), can run at the same time. The high parallelism of distributed scheduling is achieved by allowing each task (ISS) to schedule autonomously. Each task (ISS) will track the local clocks of others at its own sync points. Furthermore, according to the characteristics of a MCISS, the proposed technique predicts the possible timing of future sync points (i.e., the time point for synchronization). Based on this prediction, the time spent on synchronization decisions can be effectively shortened so that such approach enables high simulation performance for a MCISS.

Figure 2C:
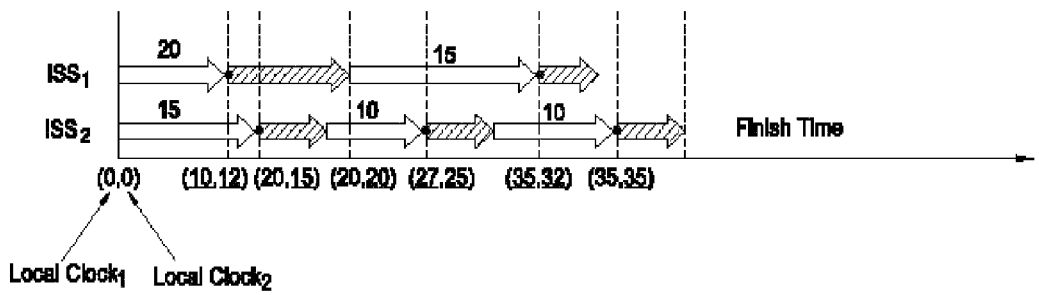
FIG. 2c illustrates the simulation timing diagram of the distributed scheduling of the present invention on two ISSs.

FIG. 2c depicts the simulation timing diagram of the same example under distributed scheduling of the present invention, which two ISSs (ISS$_1$ and ISS$_2$) are involved. Similar to centralized scheduling, when encountering a sync point, an ISS can safely continue its execution if it has the slowest local clock. The feature and advantage of distributed scheduling is that as long as an ISS has the slowest local clock, it can immediately continue the execution without further waiting for the scheduler. For instance, when ISS$_1$ is suspended at the given sync point, i.e., 20, it will resume right after it finds that ISS$_2$ also advances its local clock to 20. In contrast, for centralized scheduling, the decision for an ISS to continue execution must be made by the centralized scheduler 100. Since the centralized scheduler 100 is invoked only when an ISS encounters a sync point, a waiting ISS still has to wait until the next invocation of the scheduler 100, even if it is indeed the slowest one. Obviously, distributed scheduling allows the ISSs to attain a higher parallelism degree than centralized scheduling does. In other words, distributed scheduling approach adapted by the present invention is a high-parallelism synchronization approach for multi-core instruction-set simulation. It can gain further performance improvement by relaxing the requirement that an active ISS at a sync point can advance its execution only when it is the slowest ISS under the distributed scheduling approach.

Following the same scheduling approach of the shared memory based synchronization approach, the simulation result is still correct if the temporal order of all shared memory accesses (i.e., sync points) is maintained. In other words, an active ISS can safely proceed as long as others' next sync points are timed later than that of the local active sync point, even though it may not be the slowest ISS. To implement this approach, the temporal relationships of sync points must be determined first. It is difficult to identify a sync point's exact execution time until it is actually executed, since normally programs contain uncertain execution paths. Nevertheless, a prediction to the next earliest possible sync point is feasible and can be used to greatly improve the scheduling performance.

The following section will describe how to further optimize distributed scheduling based on the characteristics of the compiled MCISS using shared memory based synchronization.

In brief, the multi-core simulation methodology disclosed in the present invention includes "static status" and "dynamic status", and wherein "static status" means compile time and "dynamic status" means run time. In compile time, target executables are translated into native code; in run time, an instruction-set simulator will synchronize with other instruction-set simulators and execute the native code to simulate the behavior of programs.

Figure 4:
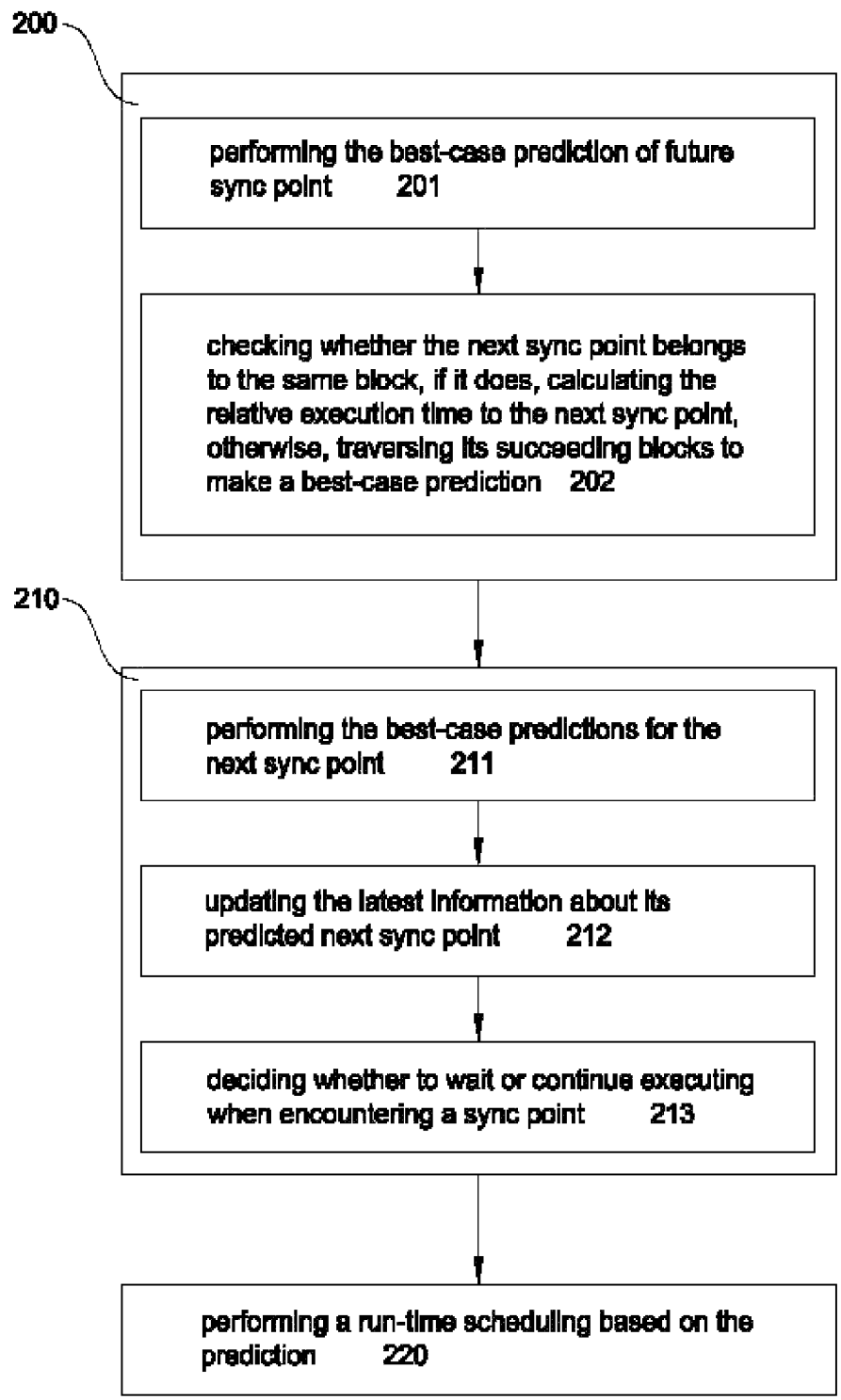
FIG. 4 illustrates a flow diagram of an embodiment of a high-parallelism synchronization approach for multi-core instruction-set simulation according to the present invention.

FIG. 4 illustrates a flow diagram of an embodiment of a high-parallelism synchronization approach for multi-core instruction-set simulation according to the present invention.

Firstly, in the step 200, a static prediction of future sync points is performed by a static module.

For example, in the step 201, the best-case prediction of future sync points for each ISS of multi-core instruction-set simulation is made by statically analyzing the control flow graphs (CFG) of a simulated program by a static module. The CFG of a simulated program can be obtained at the translation phase of a compiled ISS. With a CFG, the shortest path from one point to any other point is determinable and the shortest path can be used to estimate the best-case execution time of each basic block and/or path for each ISS of multi-core instruction-set simulation in the CFG by the static module. Based on this approach, the following algorithm is devised to identify the best-case execution time from any given point p to its next possible sync point.

```
PREDICT_NEXT_SYNC_POINT (p)
    DEFINITION
        p := a given point
        b_p := the basic block that p belongs to
        TIME_bcet (x) := for a particular point x, the best-case relative
            execution time from the head of b_x to x.
    1 if p's next sync point s is also within b_p
    2 then return TIME_bcet (s) − TIME_bcet (p)
    3 bcet = infinite
    4 for each succeeding basic block b_i of b_p do
    5     The head of b_i is h_i
    6     bcet' = PREDICT_NEXT_SYNC_POINT(h_i)
    7     if bcet > bcet'
    8     then bcet = bcet'
```

9 end for
10 the end point of $b_p$ is e
11 return bcet + $\text{TIME}_{bcet}$ (e) − $\text{TIME}_{bcet}$ (p)

Figure 5:
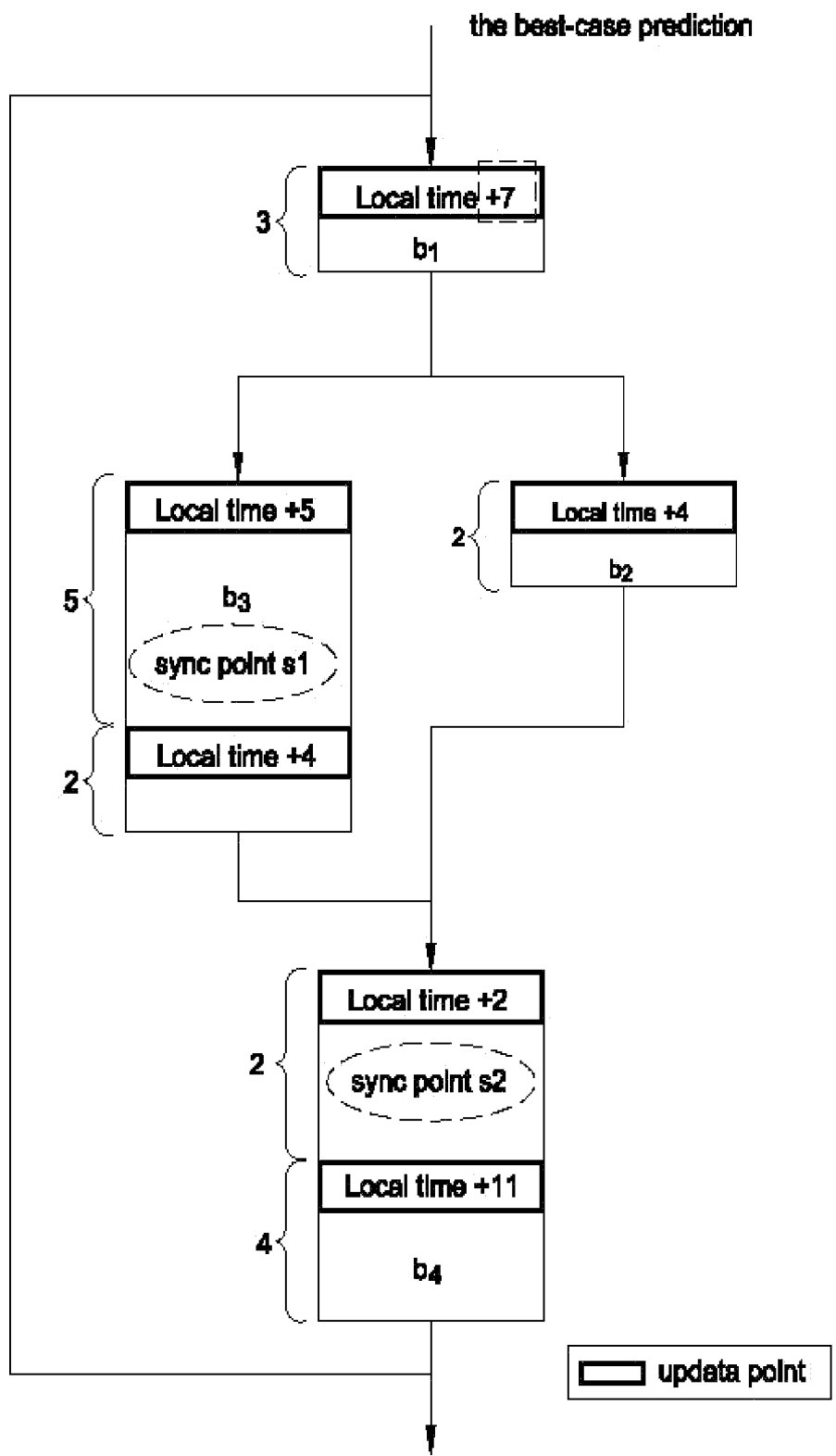
FIG. 5 illustrates the best-case prediction for the next sync point.

FIG. 5 illustrates the best-case prediction for the next sync point. It executes a simulation timing prediction for any particular point to a shared access (another point) passing through block $b_1$ block $b_4$. It assumes examining the head of basic block $b_1$ in FIG. 5. To predict its next possible sync point, in the step 202, it will first check whether the next sync point belongs to the same block; if it does, the relative execution time to the sync point can be calculated directly; otherwise, traverse its succeeding blocks to make a best-case prediction based-on the shortest path. For this embodiment, it has to check $b_1$'s succeeding blocks, $b_2$ and $b_3$, in which $b_2$ has sync point s1, but $b_3$ has no sync point. Hence, it will recursively check succeeding blocks until reaching a sync point. In this embodiment, a sync point s2 in the block $b_4$, a succeeding block of $b_3$ is identified. Then, the two paths, $b_1$ (3)→$b_2$ (5)→s1 of total delay 8 and $b_1$ (3)→$b_3$ (2) $b_4$ (2)→s2 of total delay 7, are compared to find the best-case relative execution time, i.e., 7.

Next, in the step 210, a dynamic update of next sync points is performed by a dynamic module.

In order to allow synchronization, it is necessary to obtain information about the execution timing of each ISS's next sync point. Ideally, it can make a prediction for each instruction and update the information after executing one instruction, but this will introduce heavy overheads. Accordingly, in the step 211, a practical approach is to pre-calculate the best-case delay to next sync point of each ISS for multi-core instruction-set simulation only at two types of points: (1) the tail of each sync point; (2) the head of each basic block. As illustrated in FIG. 5, the best-case predictions of the tails of sync point s1 and s2 to their next possible sync point are 4 and 11, respectively. In addition, the best-case predictions of the heads of basic block $b_1$, $b_2$, $b_3$, and $b_4$ are 7, 5, 4, and 2, respectively. After encountering these update points during simulation, the predicted execution timing of the ISS's next sync point can be promptly determined by summing up its current local time and the best-case prediction time. In this approach, every ISS can dynamically update the latest information about its predicted next sync point. Based on this information, it can decide whether to wait or continue executing when encountering a sync point.

Subsequently, in the step 220, a run-time scheduling based on the prediction is performed by a dynamic module.

Figure 6A:
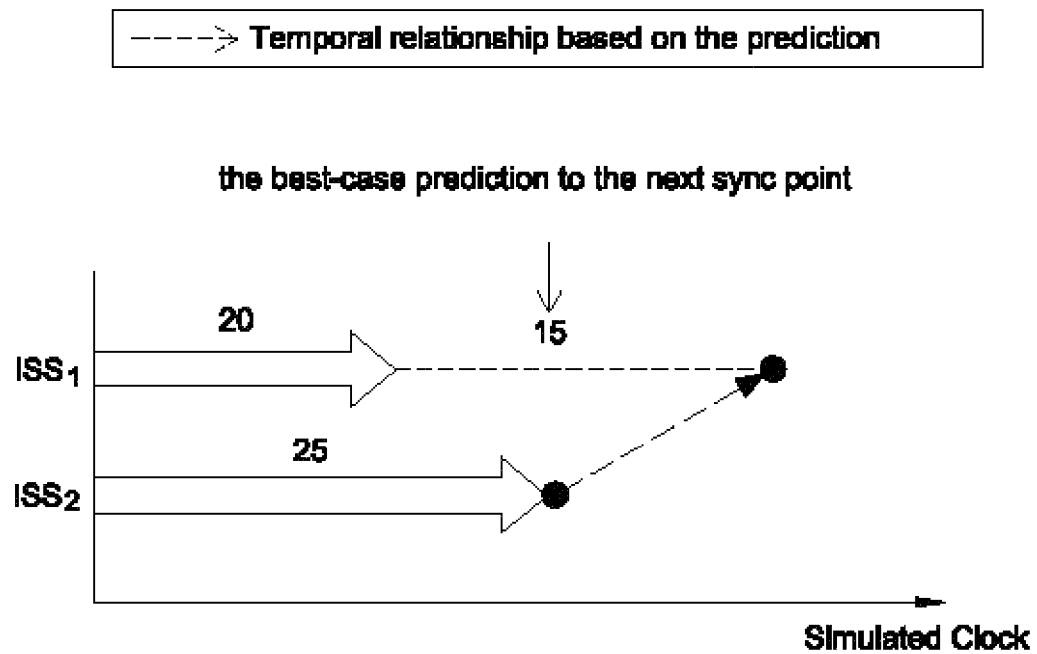
FIG. 6a illustrates an example to perform prediction-based scheduling of the multi-core instruction-set simulation.

FIG. 6a shows an example to perform prediction-based scheduling of the multi-core instruction-set simulation, in which $ISS_2$ is encountering a sync point at the time of interest, 25. No waiting for $ISS_2$ is required if the predicted next sync point of $ISS_1$ is to occur in future time. Following the original distributed scheduling mechanism mentioned above, $ISS_2$ is supposed to wait for $ISS_1$, since it is ahead of $ISS_1$, which is still at time point 20. Assume that the best-case prediction to the next sync point of $ISS_1$ is 15. In other words, the actual execution timing is at least 35, so $ISS_2$'s current sync point (i.e., 25) must be earlier. According to this temporal relationship, $ISS_2$ can continue its execution safely without stopping.

Figure 6B:
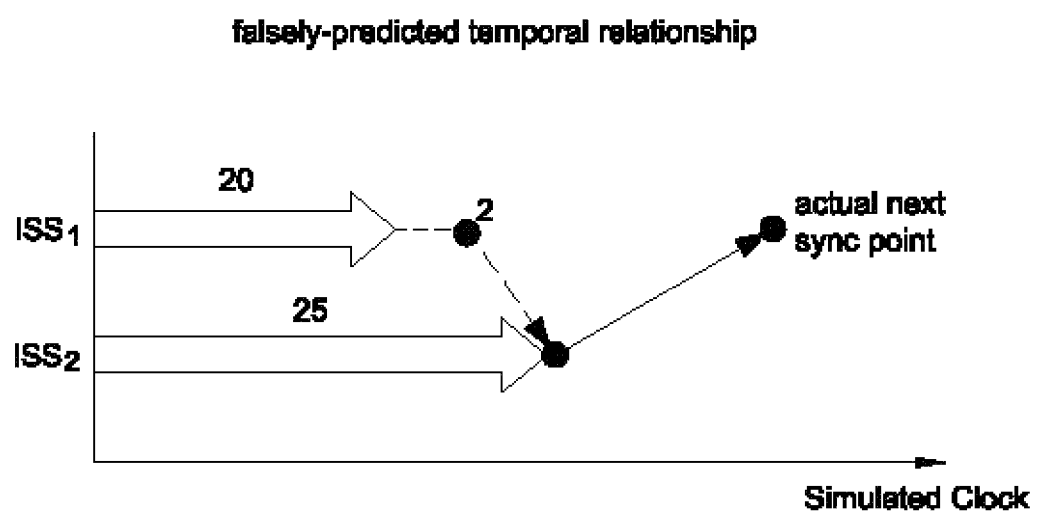
FIG. 6b illustrates another example to perform prediction-based scheduling of the multi-core instruction-set simulation.

Nevertheless, sometimes the best-case prediction may be too early, as shown in FIG. 6b. FIG. 6b illustrates another example to perform prediction-based scheduling of the multi-core instruction-set simulation. A falsely-predicted temporal relationship is created due to the best-case analysis. For this case, $ISS_1$'s predicted next sync point is earlier than the actual one, so $ISS_2$ has to wait because of the false-predicted temporal relationship. Fortunately, as $ISS_1$ keeps progressing, the best-case prediction will be updated to approach the actual sync point. As long as $ISS_1$'s predicted next sync point becomes later than the current sync point of $ISS_1$, their temporal relationship will be correct, and $ISS_2$ can resume its execution immediately (synchronously). In contrast, the original distributed scheduling mechanism must keep $ISS_2$ waiting until the local time of $ISS_1$ is later than that of $ISS_2$.

As a result, the proposed distributed scheduling mechanism would effectively shorten synchronization time in both cases and hence allow higher parallelism for a MCISS.

Figure 7:
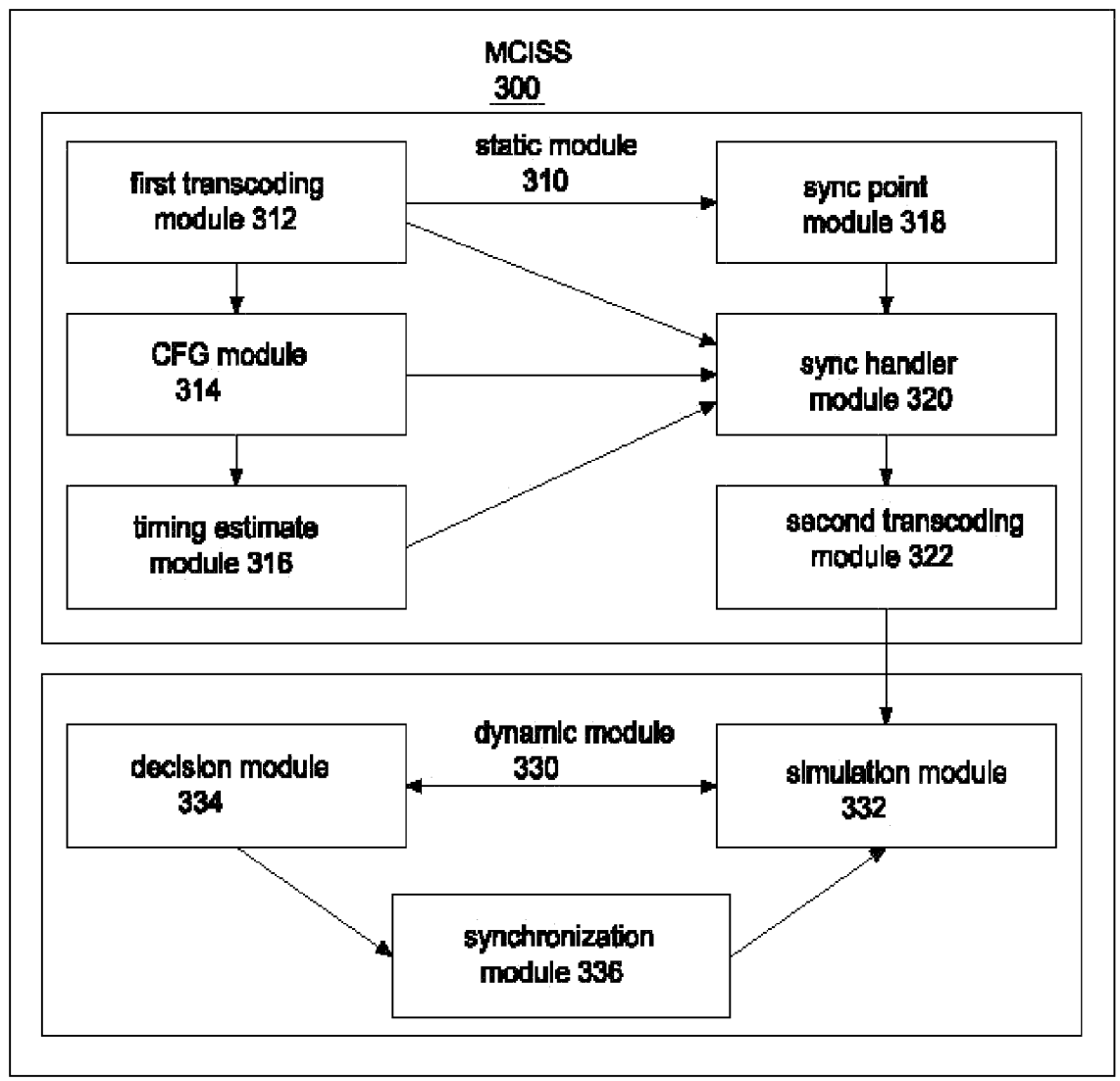
FIG. 7 illustrates a block diagram of an embodiment of a device for multi-core instruction-set simulation.

FIG. 7 illustrates a block diagram of an embodiment of a device for multi-core instruction-set simulation. To implement the high-parallelism synchronization approach for multi-core instruction-set simulation, this invention provides a multi-core instruction-set simulation device. In one embodiment, the multi-core instruction-set simulation device 300 comprises a static module 310 and a dynamic module 330.

The static module 310 comprises: a first transcoding module 312, a control flow graph (CFG) module 314, a timing estimation module 316, a sync point module 318, a sync handler module 320, and a second transcoding module 322. The first transcoding module 312 is used to convert a binary program of a client frame into an intermediate code. The control flow graph module 314 coupled to the first transcoding module 312 is used to analyze the control flow instructions (such as jump, call, and return) and establish a control flow graph of the binary program. A timing estimation module 316 coupled to said control flow graph module 314 is used to estimate the execution time of each basic block in the control flow graph, estimate the relative time (measured from the start of a basic block) of each read or write memory instruction, and find out the read or write memory instruction which is the earliest possible instruction to be met after finishing the execution of a basic block. The sync point module 318 is coupled to said first transcoding module 312 for setting each read or write memory instruction to be a sync point, wherein if the register used to point to the addresses of read or write memory instructions is a stack pointer register or a frame pointer register, the sync points of given instructions are removable. The sync handler module 320 is coupled to the first transcoding module 312, the control flow graph module 314, the timing estimation module 316, and the sync point module 318 for inserting the corresponding sync handler respectively according to each sync point. The second transcoding module 322 is coupled to the sync handler module 320 for generating native code corresponding to the simulated binary program by the intermediate code and the read or write memory instruction which is the earliest possible instruction to be met after finishing the execution of a basic block. On the one hand, the dynamic module 330 comprises a simulation module 332, a decision module 334, and a synchronization module 336. The simulation module 332 is coupled to the second transcoding module 322 in static module and used to perform a simulation process by executing generated native code, wherein when an instruction-set simulator reaches to a sync point, the instruction-set simulator stops and executes a sync handler. The decision module 334 is coupled to the simulation module 332 for checking the address of read or write memory of the instruction-set simulator which has entered the sync handler, wherein if it is not within the scope of a shared memory segment, the instruction-set simulator will stop the sync handler and subsequently perform the synchronization process. The synchronization module 336 coupled to the decision module 332 and the simulation module 334, wherein if the decision module 334 decides the address of the read or write memory instruction of the instruction-set simulator is within the scope of a shared memory segment, the instruction-set simulator synchronized with other instruction-set simulators and the instruction-set simulator will subsequently execute the simulation process after completing the synchronization.

The following describes the experimental results that different scheduling mechanisms are combined into a developed compiled MCISS. The setup is as follows. The target architecture for simulation is AndesStar 16/32-bit mixed length RISC ISA (refer to: AndeStar™ ISA, available at www.andestech.com/p2-2.htm, 2010.). The parallel programs Radix, FMM, FFT, Ocean, LU, and Barnes from SPLASH-2 (refer to: S. Woo, M. Ohara, E. Torrie, J. P. Singh, and A. Gupta, "The splash-2 programs: characterization and methodological considerations," in Proc. of international Symposium on Computer Architecture (ISCA), pp. 24-36, 1995.) are used as benchmark test cases. The host machine is equipped with an Intel Xeon 2.6 GHz quad-core. In order to test simulation performance under the maximum parallelism allowed by the host, the cases of two and four simulated cores are evaluated, respectively. Table 1 shows the performance speedup against the other three approaches previously mentioned.

TABLE 1

| Benchmarks | Shared Mem. Ratio | Lock-Step | | Centralized Scheduling | | Distributed Scheduling w/o Prediction | |
|---|---|---|---|---|---|---|---|
| | | 2 Cores | 4 Cores | 2 Cores | 4 Cores | 2 Cores | 4 Cores |
| RADIX | 0.19% | 56.1 | 79.8 | 4.6 | 9.9 | 1.0 | 3.6 |
| FMM | 0.73% | 46.9 | 80.5 | 3.7 | 11.2 | 1.0 | 2.5 |
| FFT | 1.7% | 36.2 | 37.0 | 3.2 | 11.1 | 1.2 | 4.1 |
| Ocean | 1.82% | 31.7 | 44.4 | 6.3 | 8.6 | 1.3 | 4.4 |
| LU | 3.19% | 29.4 | 40.3 | 4.6 | 21.3 | 1.5 | 8.2 |
| Barnes | 14.21% | 19.7 | 33.9 | 18.5 | 57.9 | 6.3 | 8.6 |
| Average | 3.64% | 36.7 | 54.3 | 6.8 | 20.0 | 2.1 | 5.2 |

It is noted that the shared memory ratio of the table 1 is the number of shared memory accesses over all the memory accesses.

The first experiment makes a comparison with the lock-step approach. With the advantage of considerably fewer sync points, the proposed mechanism outperforms it by a factor of 36 to 54 times. In general, the benchmark with a lower shared memory ratio leads to greater performance improvement, since the present invention's approach requires fewer synchronization efforts when the number of shared memory accesses is lower.

Moreover, compared to the same shared memory based synchronization but under parallel centralized scheduling, the present invention's distributed scheduling mechanism still achieves notable improvements of 6 to 20 times. In the present invention, due to prediction of future sync points, the speedup is even greater than the maximum parallelism allowed by the number of simulated cores. Hence, it can demonstrate the high parallelism achieved by the proposed mechanism. Furthermore, in contrast to distributed scheduling without sync point prediction, as mentioned above, the proposed mechanism of the present invention still has 2 to 5 times performance speedup. The enhancement becomes significant as the shared memory ratio grows in general. This is because the present invention's prediction method effectively shortens the waiting time on a sync point. Correspondingly, the speedup becomes significant if there are more sync points, i.e., more shared memory accesses.

Overall, the proposed distributed scheduling mechanism attains better improvement as the number of simulated cores increases, indicating that the present invention's mechanism has better scalability than a conventional centralized scheduling mechanism.

Figure 8:
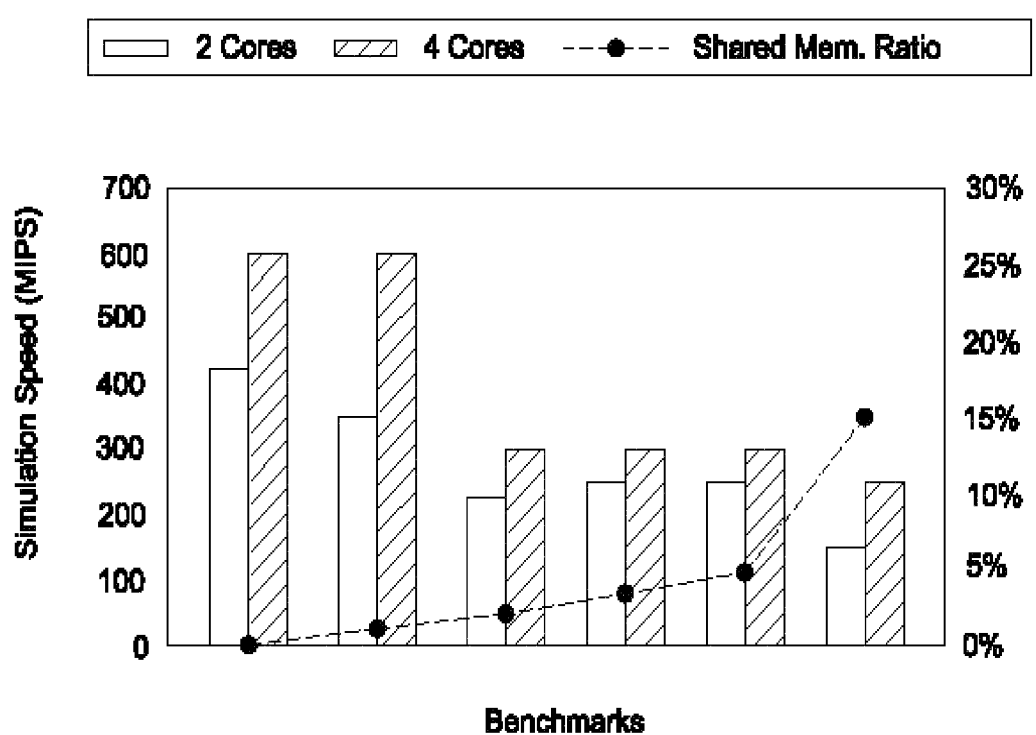
FIG. 8 illustrates the absolute simulation speed of the proposed approach according to the present invention.

FIG. 8 shows the absolute simulation speed of the proposed approach by different benchmarks according to the present invention, which is also sensitive to the shared memory ratio. The test cases with lower shared memory ratios tend to reach higher speeds. Given different benchmarks, it can perform 150 to 600 MIPS, which means that the proposed approach of the present invention is feasible for a high-speed MCISS. In the present invention's experiments, the prediction method takes 12.4% extra translation time. Nevertheless, the total translation time is less than 10% of the total simulation time for a compiled ISS in general. Consequently, the overhead due to the present invention's mechanism is minor in terms of the whole simulation.

The following experimental results of the table 2 prove that the high-parallelism synchronization approach for multi-core instruction-set simulation in the present invention can advance the simulation efficiency and significantly shorten the simulation time.

TABLE 2

| The present invention | Lock-Step approach | Cooperative approach |
|---|---|---|
| 40 MIPS~1 GIPS | <1 MIPS | 1~30 MIPS |

Table 2 shows the simulation speed by using different methods.

To sum up, the method for multi-core instruction-set simulation disclosed by the present invention is able to effectively reduce the synchronization overheads and achieve the accurate simulation at the same time.

The above descriptions are some of the embodiments of the present invention. Those skilled in the art should appreciate that the scope of the present invention is not limited to the described preferred embodiments. The scope of the present invention is expressly not limited expect as specified in the accompanying claims. Various changes and modifications can be made within the spirit and scope of the present invention, as defined by the following Claims.

What is claimed is:

1. A parallelism synchronization method for multi-core instruction-set simulation, comprising:
   performing a best-case prediction of future sync points for each ISS of multi-core instruction-set simulation by analyzing control flow graphs of a simulated program by a static module;
   checking whether a next sync point for said each ISS belongs to the same block; if it does, a relative execution time to said next sync point can be calculated; otherwise, traverse its succeeding blocks to make said best-case prediction of said next sync point based-on the shortest path; wherein said best-case prediction of said next sync point for said each ISS is performed by recursively checking said succeeding blocks until reaching a sync point, and comprises a step of pre-calculating best-case delay to said next sync point of said each ISS;

estimating best-case execution time of each basic block and/or path for said each ISS of said multi-core instruction-set simulation in said control flow graphs by said static module; and utilizing distributed scheduling said each ISS of said multi-core instruction-set simulation based-on said best-case prediction of said future sync points and said best-case execution time by a dynamic module for shortening the waiting time of said each ISS spent on synchronization.

2. The method according to claim 1, wherein said pre-calculating the best-case delay comprises two types of points which one is a tail of said next sync point and another is a head of said each basic block.

3. The method according to claim 2, wherein predicted execution timing of said next sync point for said each ISS can be determined by summing up its current local time and best-case prediction time.

4. The method according to claim 3, further comprising updating the an information about predicted said next sync point.

5. The method according to claim 4, further comprising deciding whether to wait or continue executing when encountering said next sync point based on said information.

6. The method according to claim 1, wherein said distributed scheduling is allowing said each ISS to schedule with others autonomously to run at the same time.

7. The method according to claim 1, wherein as first ISS of said multi-core instruction-set simulation is encountering a next sync point, no waiting for second ISS of said multi-core instruction-set simulation is required if predicted said next sync point of said first ISS is to occur in future time.

8. The method according to claim 1, wherein as first ISS's predicted next sync point of said multi-core instruction-set simulation is earlier than an actual next sync point, and second ISS of said multi-core instruction-set simulation has to wait because of a false-predicted temporal relationship.

9. The method according to claim 1, further comprising performing a run-time scheduling based on said best-case prediction by said dynamic module.

10. The method according to claim 8, wherein as long as said first ISS's predicted next sync point becomes later than a current sync point of said first ISS, said second ISS can resume its execution synchronously.

* * * * *